Jan. 31, 1961 J. E. SCHRAMECK 2,970,198

COMPRESSED-GAS CIRCUIT INTERRUPTER

Filed Feb. 18, 1957 8 Sheets-Sheet 1

COMPRESSED-GAS CIRCUIT INTERRUPTER

Filed Feb. 18, 1957 8 Sheets-Sheet 2

WITNESSES

Edwin E. Bassler

Wm. B. Sellers.

INVENTOR

Jack E. Schrameck

BY

Willard R. Crout

ATTORNEY

Jan. 31, 1961 J. E. SCHRAMECK 2,970,198

COMPRESSED-GAS CIRCUIT INTERRUPTER

Filed Feb. 18, 1957 8 Sheets-Sheet 5

Jan. 31, 1961 J. E. SCHRAMECK 2,970,198

COMPRESSED-GAS CIRCUIT INTERRUPTER

Filed Feb. 18, 1957 8 Sheets-Sheet 7

Jan. 31, 1961 J. E. SCHRAMECK 2,970,198

COMPRESSED-GAS CIRCUIT INTERRUPTER

Filed Feb. 18, 1957 8 Sheets-Sheet 8

2,970,198

COMPRESSED-GAS CIRCUIT INTERRUPTER

Jack E. Schrameck, Pittsburgh, Pa., assignor to Westinghouse Electric Corporation, East Pittsburgh, Pa., a corporation of Pennsylvania Filed Feb. 18, 1957, Ser. No. 640,861

19 Claims. (Cl. 200—148)

This invention relates to circuit interrupters in general and more particularly to compressed-gas circuit interrupters adapted to interrupt relatively high power.

A general object of the invention is to provide an improved compressed-gas circuit interrupter which will be of reduced size, and which will operate more effectively than circuit interrupters heretofore utilized by the industry.

A more specific object of the invention is to provide an improved compressed-gas circuit interrupter employing a pressurized tank, into which extends a pair of terminal bushings, and within which is disposed the interrupting assembly for the circuit interrupter.

Yet a further object of the invention is to provide an improved compressed-gas circuit interrupter using a grounded, pressurized, metallic tank, into which extends a pair of terminal bushings and having an improved interrupting structure.

A further object of the invention is to provide an improved operating mechanism for a compressed-gas circuit interrupter of the type having two serially-related breaks with an impedance, or a resistance, shunting one of the breaks.

Another object of the invention is to provide an improved compressed-gas circuit interrupter, in which a single control valve may be employed to effect both an opening and a closing operation of the interrupter.

Yet a further object of the invention is to provide an improved compressed-air circuit interrupter in which compressed air is used as the interrupting medium, for mechanical operation, and for insulation strength.

In United States Patent 2,632,078, issued March 17, 1953, to Benjamin P. Baker and Erling Frisch, and assigned to the assignee of the instant application, there is illustrated and claimed a compressed-gas circuit interrupter employing a pair of serially-related breaks in which one of the breaks has a shunting resistance, and in which both breaks are arranged to be sequentially operated. It is a further object of the present invention to extend the operating principles of the aforesaid interrupter of this patent to very high current and voltage, adapting the same for very high-power application.

Although certain features of the present invention render the same particularly suitable for very high-power application, other features are susceptible to use on lower power application, and may have very wide use. It is, therefore, to be clearly understood that the present invention is not exclusively directed to high-power application, but contains certain features suitable for widespread application, even on lower-power applications.

Yet a further object of the present invention is to provide a certain minimum size for a compressed-gas circuit interrupter, which will form a base unit applicable to circuit operation at 138 kv., approximately, but which may be extended to 230 or 330 kv., or higher voltages maintaining proportional minimum dimensions.

Still a further object of the invention is to provide an improved compressed-gas circuit interrupter in which the blast valve is immediately adjacent to the interrupter, so that high-pressure air is available immediately at the interrupting element to provide an intense air blast and to reduce the time interval from initiation of a short circuit to circuit interruption.

Another object of the invention is to provide an improved circuit interrupter with means for mounting bushing-type current transformers, and to provide bushing potential taps for operating potential devices.

An ancillary object of the invention is to provide main contact fingers having a lateral flexibility so that separation of the main current-carrying parts will occur in blast air, after the blast valve is unseated.

Another object of the invention is to provide an improved compressed-gas circuit interrupter in which sequential reclosing of a pair of serially-related breaks takes place, so that high-pressure air is maintained on the second set of contacts for circuit isolation, yet permitting the first set of contacts to reclose with a minimum time delay, thus conserving air and reducing the duty of opening and closing the circuit by a single set of contacts, that is, one set of contacts having the brunt of opening the circuit, whereas the second set of contacts has the function of closing the circuit.

Yet a further object of the invention is to provide an improved compressed-gas circuit interrupter in which the mechanical support for the movable isolating contact serves also as a valve to actuate the reclosing of the arcing set of contacts.

Another object of the invention is to provide an improved conservator for eliminating the waste of compressed air and for maintaining the isolating contacts, when separated, in a high-pressure atmosphere.

Still a further object of the invention is to provide an improved circuit interrupter of the compressed-gas type in which the blast valve is arranged to be reseated upstream from the interrupter, which must interrupt the total circuit current and wherein a downstream valve, responsive to the air pressure on the isolator side of the interrupter, maintains air pressure on the isolating gap, but is subject to reduced contamination due to its location on the isolator side of the interrupter.

A further object of the invention is to provide an improved compressed-gas circuit interrupter in which a downstream valve on the isolator side responds automatically to the isolator contact position to provide exhaust of air pressure through the isolator contacts, or to maintain high-pressure air in the isolating contact gap.

Further objects and advantages will readily become apparent upon reading the following specification, taken in conjunction with the drawings, in which.

Figure 6:
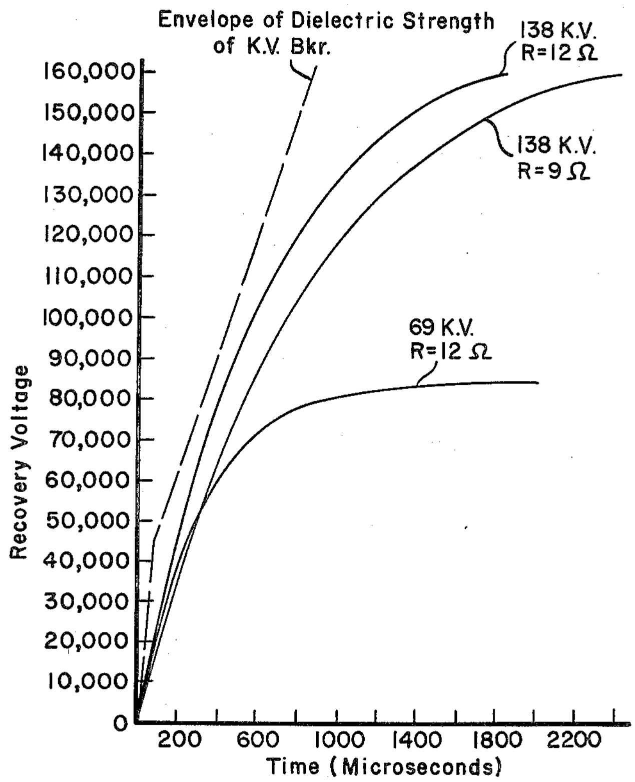
Figure 7:
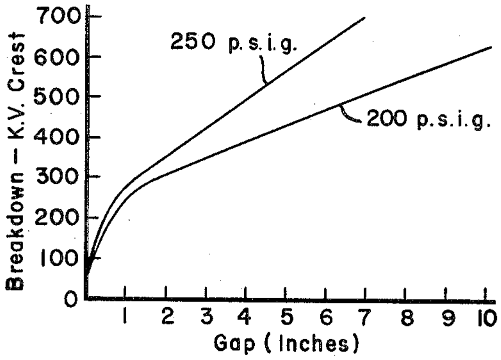
Figure 8:
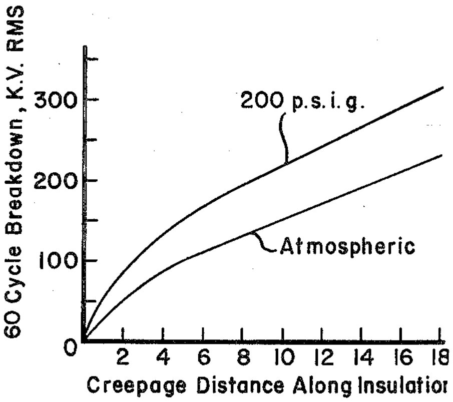

Figs. 5A, 5B, 5C, and 5D, collectively, illustrate, in an enlarged manner, a vertical, sectional view through one of the lead-in bushings, the interrupting assembly, and a portion of the other lead-in bushing, the positions of the several parts being shown in the closed-circuit position. Again this view is taken from the opposite direction than the view of Fig. 2;

Fig. 6 illustrates operating curve characteristics of a typical compressed-gas circuit interrupter, plotting recovery voltage against time for particular impedance and voltage ratings, and with the envelope of dielectric strength of a typical 69 kv. break being indicated;

Fig. 7 illustrates curves of the breakdown voltage of 1¼ inch rod gaps in 200 and 250 p.s.i.g. atmospheres at different gap distances in inches; and Fig. 8 shows the breakdown strength along a typical insulation under 200 p.s.i.g. air pressure as compared to the breakdown strength of the same insulating material under atmospheric pressure.

Figure 1:
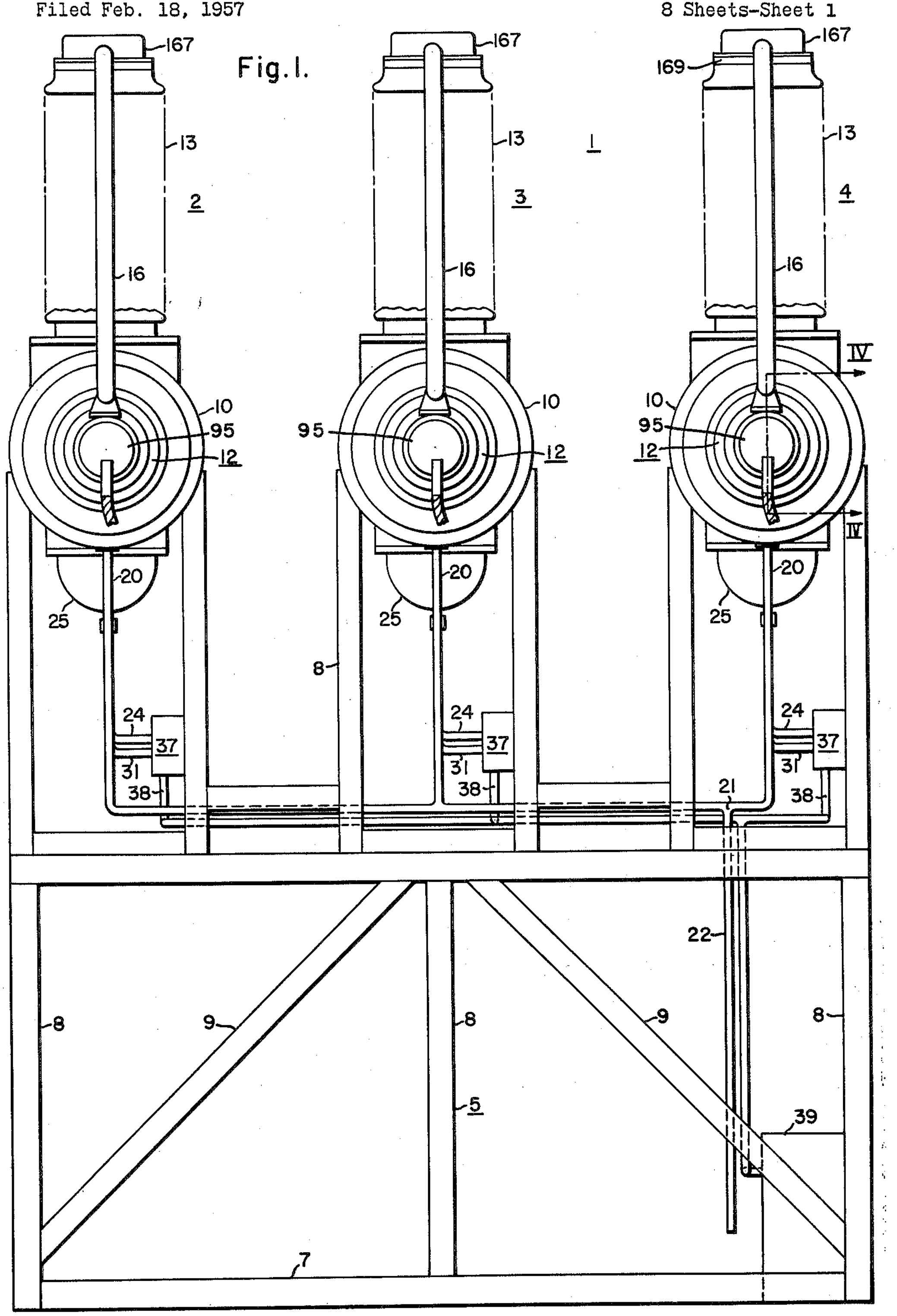
Fig. 1 is an end elevational view of a three-phase compressed-gas circuit interrupter embodying the principles of the invention.
Figures 2, 3:
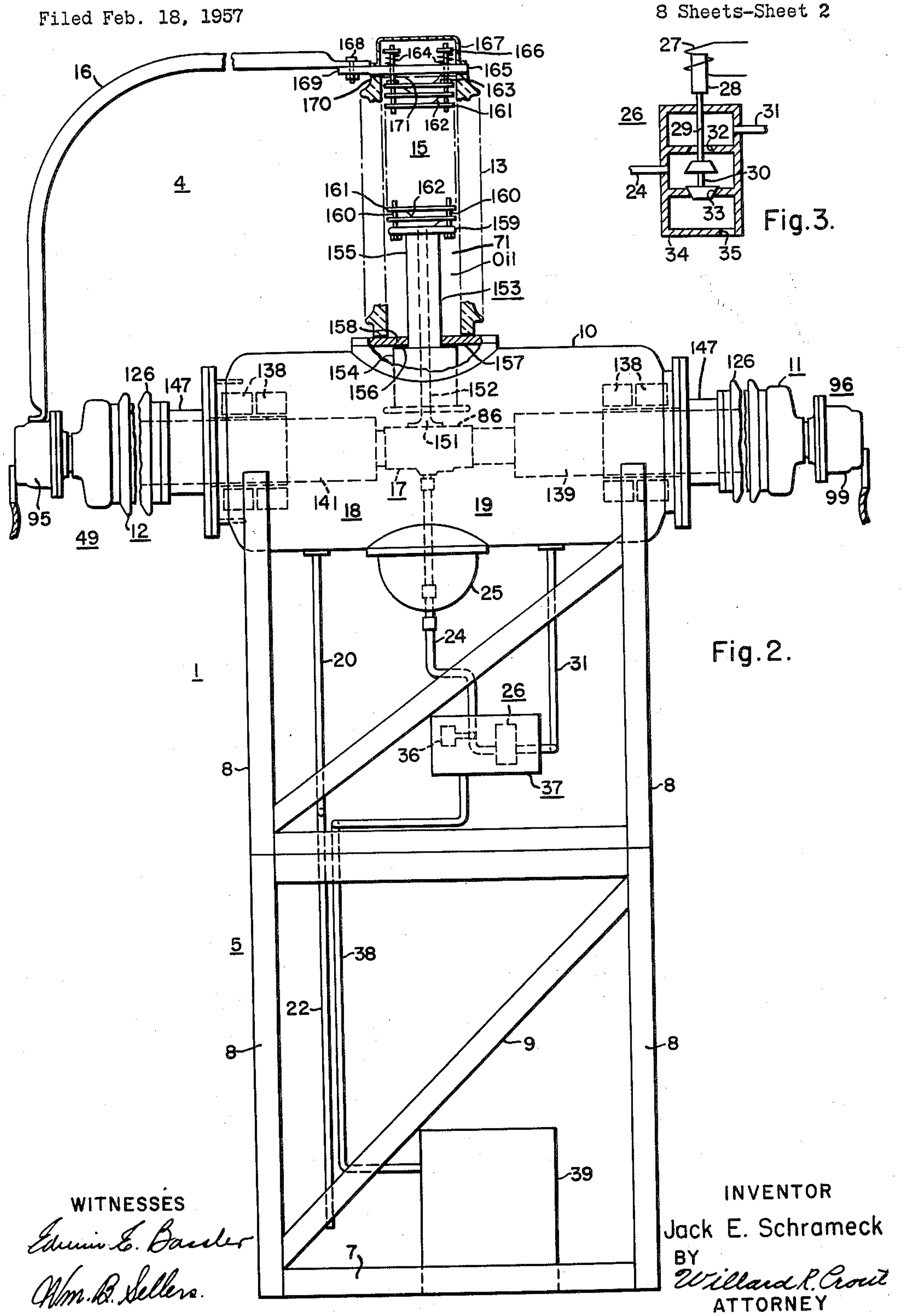
Fig. 2 is a side elevational view of one of the end poles of the circuit interrupter of Fig. 1.
Fig. 3 is a diagrammatic view illustrating the inner construction of the control valve shown in Fig. 2.

Referring to the drawings, and more particularly to Figs. 1 and 2 thereof, the reference numeral 1 generally designates a three-phase, compressed-gas circuit interrupter, in this particular instance utilizing compressed air, and including three pole units 2–4, which are supported on an angle iron framework 5. The framework 5 may consist of a suitable base 7 for upright members 8 and diagonally extending bracing members 9, which rigidly support a grounded, metallic, pressurized tank 10 for each pole unit of the interrupter 1.

With particular reference to Fig. 2, it will be noted that the pressurized, metallic tank 10 is supported, as by welding, to the upper ends of the angle iron uprights 8, and has extending therein, at its opposite ends, a pair of terminal bushings 11 and 12. Extending upwardly from the tank 10 is a resistor, or an impedance casing 13, composed of a suitable weather-proof material, such as porcelain, which houses an interiorly disposed impedance element or impedance means 15, more fully described hereinafter. A copper-connecting tube 16 electrically connects the upper end of the impedance element 15 with the outer end of the terminal bushing 12.

Disposed interiorly within the tank 10 is an electrically bridging interrupting assembly, generally designated by the reference numeral 17 (Fig. 4) and including a main-current interrupting unit 18 in series relation with an impedance interrupting unit 19. The interrupting units 18 and 19 are disposed interiorly within the grounded metallic casing 10, which is pressurized to any suitable pressure, for example, 250 pounds per square inch.

With reference to Figs. 1 and 2, it will be noted that inlet conduits 20 lead into each pressurized tank 10, and are connected, as at 21 in Fig. 1, to form a common inlet tube 22, the latter leading to any suitable source of compressed gas, such as air, at the desired pressure, which is here assumed to be 250 p.s.i.g.

A control conduit 24 is also associated with each pole unit leading into a dome-shaped inspection cover 25, the conduit 24 either being maintained at a high pressure, such as the tank pressure of 250 p.s.i.g., or at a low, or atmospheric pressure, as determined by the operation of an electromagnetic control valve, generally designated by the reference numeral 26, and shown more in detail in Fig. 3 of the drawings. As illustrated in Fig. 3, the electromagnetic control valve 26 is solenoid operated, having solenoid 27 adapted to raise an armature 28 connected to a valve stem 29 and operating a two-way valve 30. In one position of the valve 26 the control conduit 24 is connected through the valve 26 to the high-pressure conduit 31, which leads directly to the high-pressure tank 10. Fig. 3 shows the valve 26 in this position, which corresponds to the closed-circuit position of the interrupter 1.

In the other position of the valve 26, as brought about by the energization of the solenoid 27, the two-way valve 30 raises, to close off the opening 32 to the high-pressure conduit 31, and to open the lower opening 33 of the valve casing 34 to the outlet opening 35 leading to atmosphere. Thus, operation of the valve 26 will either place high-pressure air within the control pipe 24 or will dump the high-pressure air therefrom. A pressure gauge 36 may also be provided with the valve 26 in a control compartment 37, the latter having a cable connection 38 with a control box 39 disposed at the lower end of the framework 5.

Figure 4:
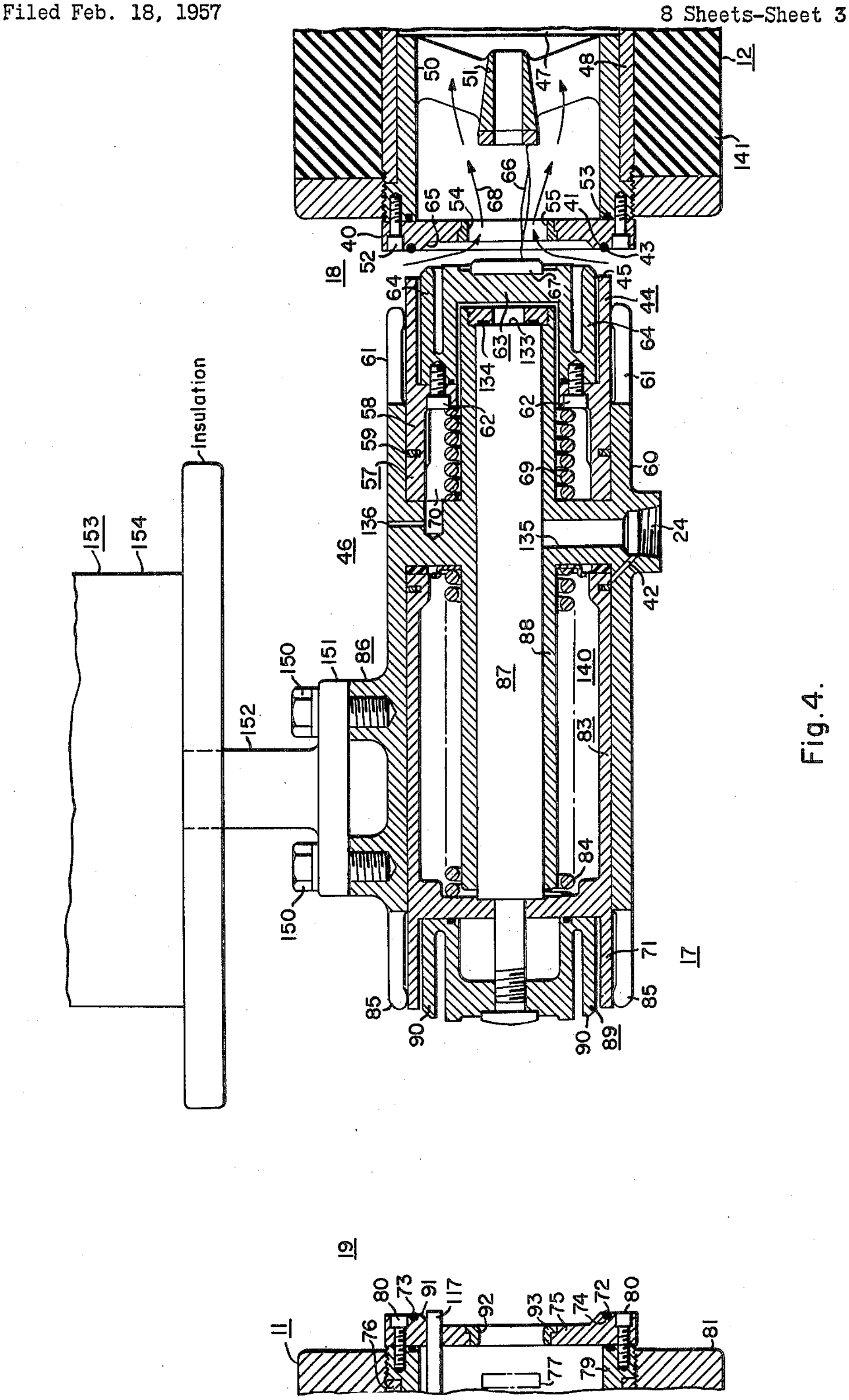
Fig. 4 is a fragmentary enlarged, vertical sectional view through the interrupting assembly of the circuit interrupter of Fig. 1, taken substantially along the line IV—IV of Fig. 1 looking in the direction of the arrows, with the contact structure being illustrated in the open-circuit position. It will be noted that this view is taken from the opposite direction than the view of Fig. 2.

With particular reference to Fig. 4, which shows the interrupting assembly 17 in the open-circuit position, and turned about from the view shown in Fig. 2, it will be observed that the main current interrupting unit 18 includes a relatively stationary orifice-shaped contact 40, having an annular recess 41 therein, which accommodates an annular gasket 43, constituting a valve seat for an annular blast valve 44 having a valve face 45. In the closed-circuit position of the main current interrupting unit 18, the valve face 45 abuts the valve seat 43 to close off the high-pressure within the region 46 within the tank 10 from the region 47 within terminal bushing 12 at atmospheric pressure. In other words, the interior 47 of the tubular terminal stud 48 extending through the terminal bushing 12, is at atmospheric pressure, freely communicating with the region 49 externally of the interrupter 1, through the hollow terminal bushing 12 itself.

Abutting the inner end of the tubular terminal stud 48 is a support 50, having integrally formed therewith an apertured arc-catcher 51, the purpose for which will be explained hereinafter. Preferably, mounting bolts 52 secure the stationary orifice contact 40 to the support 50, there preferably being provided a gasketed seal 53 therebetween. The orifice 54 through the stationary contact 40 may be provided with an arc-resisting orifice liner 55, composed of any suitable arc-resisting material.

The blast valve 44 is a part of a movable piston assembly, generally designated by the reference numeral 57. The blast valve 44 is generally of tubular configuration, having a piston portion 58 with a piston ring 59 being slideable within a stationary operating cylinder 60. The operating cylinder 60 has a plurality of separate resilient contact fingers 61, the outer free ends of which bear laterally against the outer wall of the blast valve 44 making good contact therebetween.

Figure 5A:
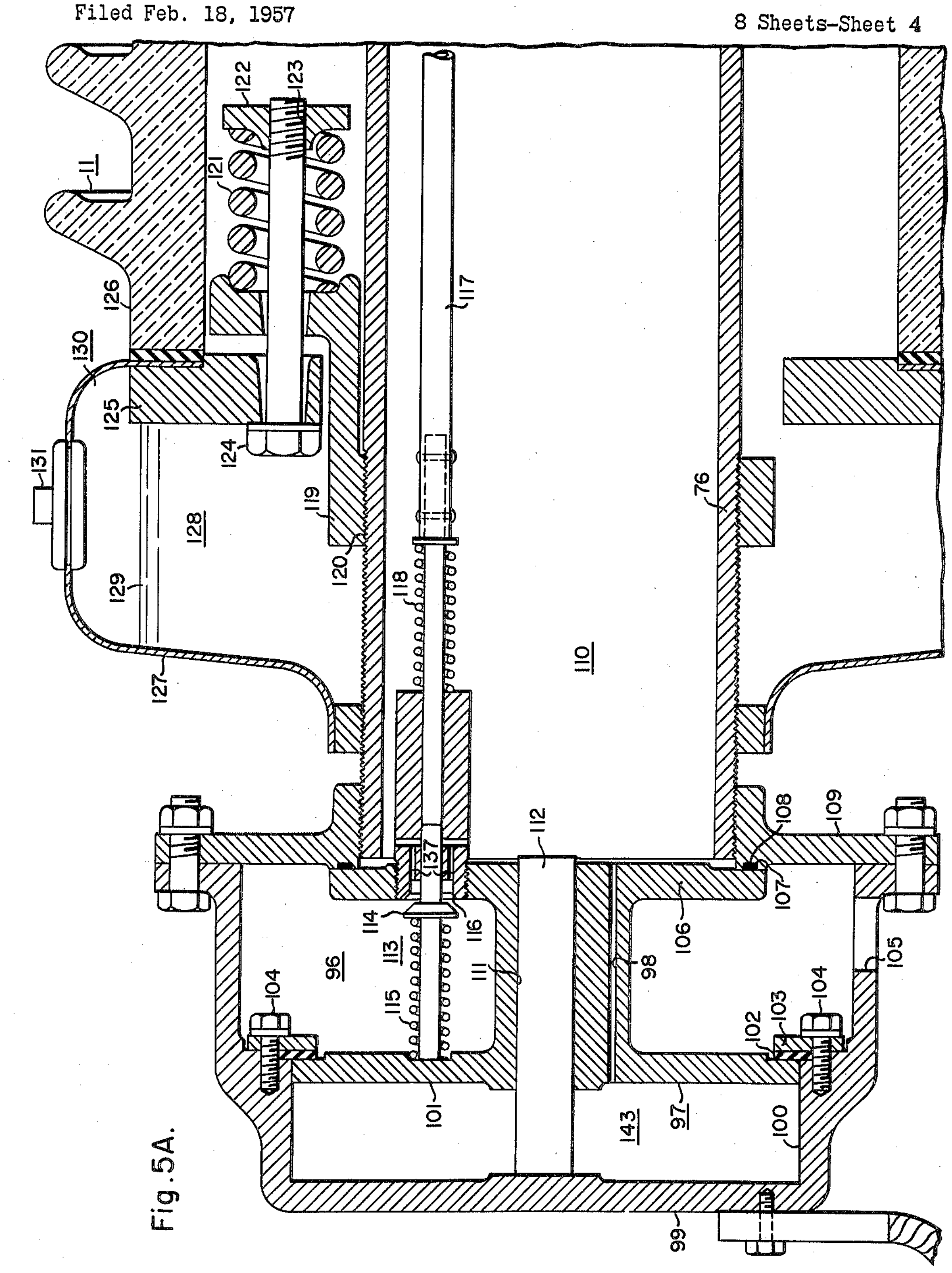
Figure 5B:
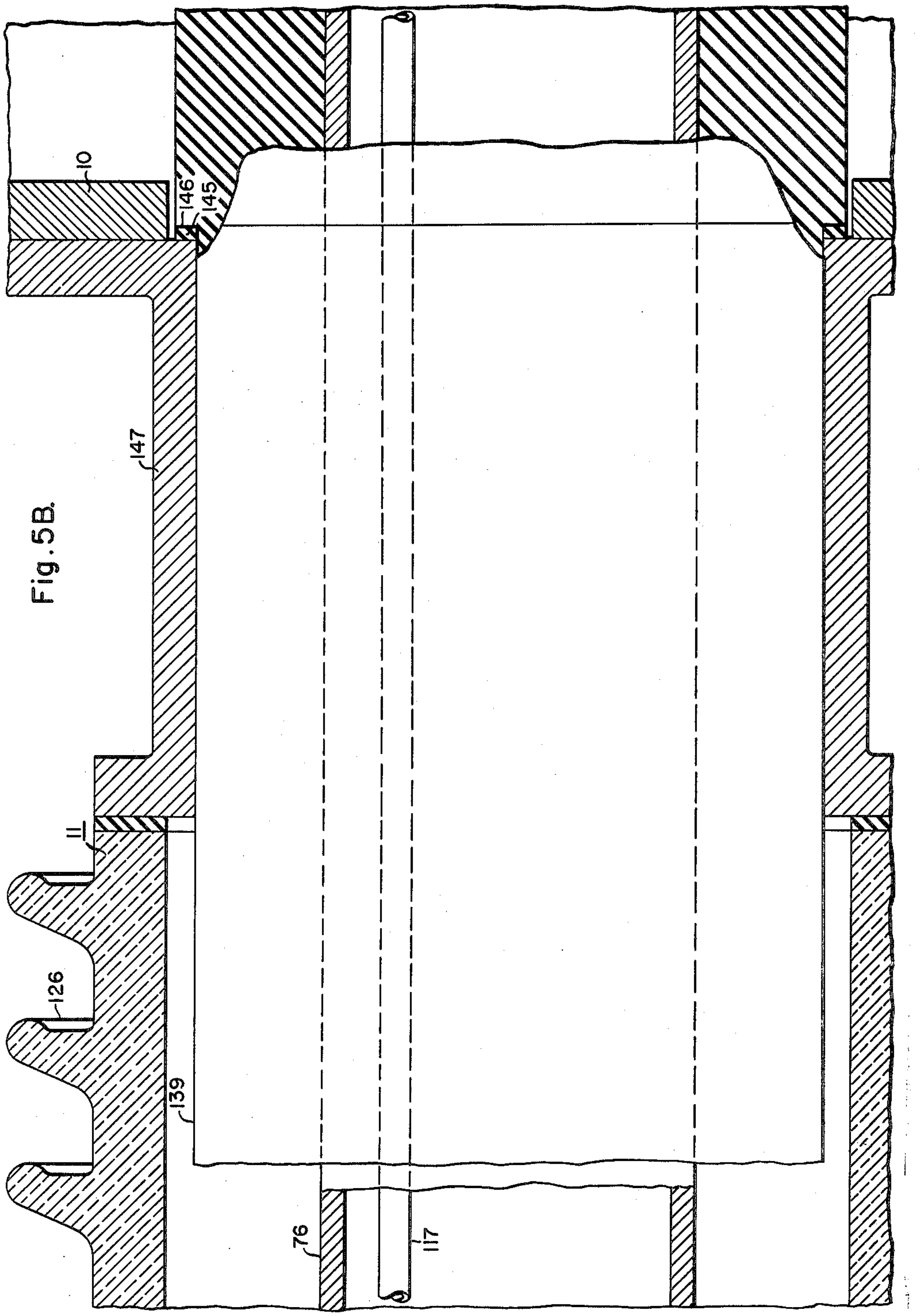

Bolted, as by bolts 62, to the piston portion 58 of the blast valve 44 is a tubular movable contact assembly, generally designated by the reference numeral 63, and including a plurality of laterally resilient, flexible main contact fingers 64, which engage a beveled portion 65 of the stationary orifice contact 40. The construction is such that, in the closed-circuit position, as shown in Fig. 5D, the main contact fingers 64 are flexed radially inwardly so that during the opening, leftward movement of the piston assembly 57, opening of the blast valve 44 will take place prior to separation between the main contact fingers 64 and the cooperating contact portion 65. As a result, an immediate application of a blast of compressed air is available at the moment of contact parting. The main current arc 66, illustrated in Fig. 4, will be carried within the orifice 54 so that one terminal thereof attaches to the arc catcher 51, whereas the other terminal of the arc 66 terminates at a movable arc-resisting contact 67. In this position, as indicated in Fig. 4, the arc 66 is subjected to a radially inflowing blast of gas, as indicated by the arrows 68.

Fig. 4 illustrates the fully open-circuit position of the main current interrupting unit 18, but the arc 66, nevertheless, has been drawn in for purposes of illustration.

With reference to Fig. 5D, it will be noted that the piston assembly 57 is spring-biased by a compression spring 69 in a direction to effect closure of the contacts 64 and 65. As will be more fully explained hereinafter, movement of the piston assembly in the opening direction is brought about by a reduction of pressure within the region 70 in back of the piston 58.

Figure 5C:
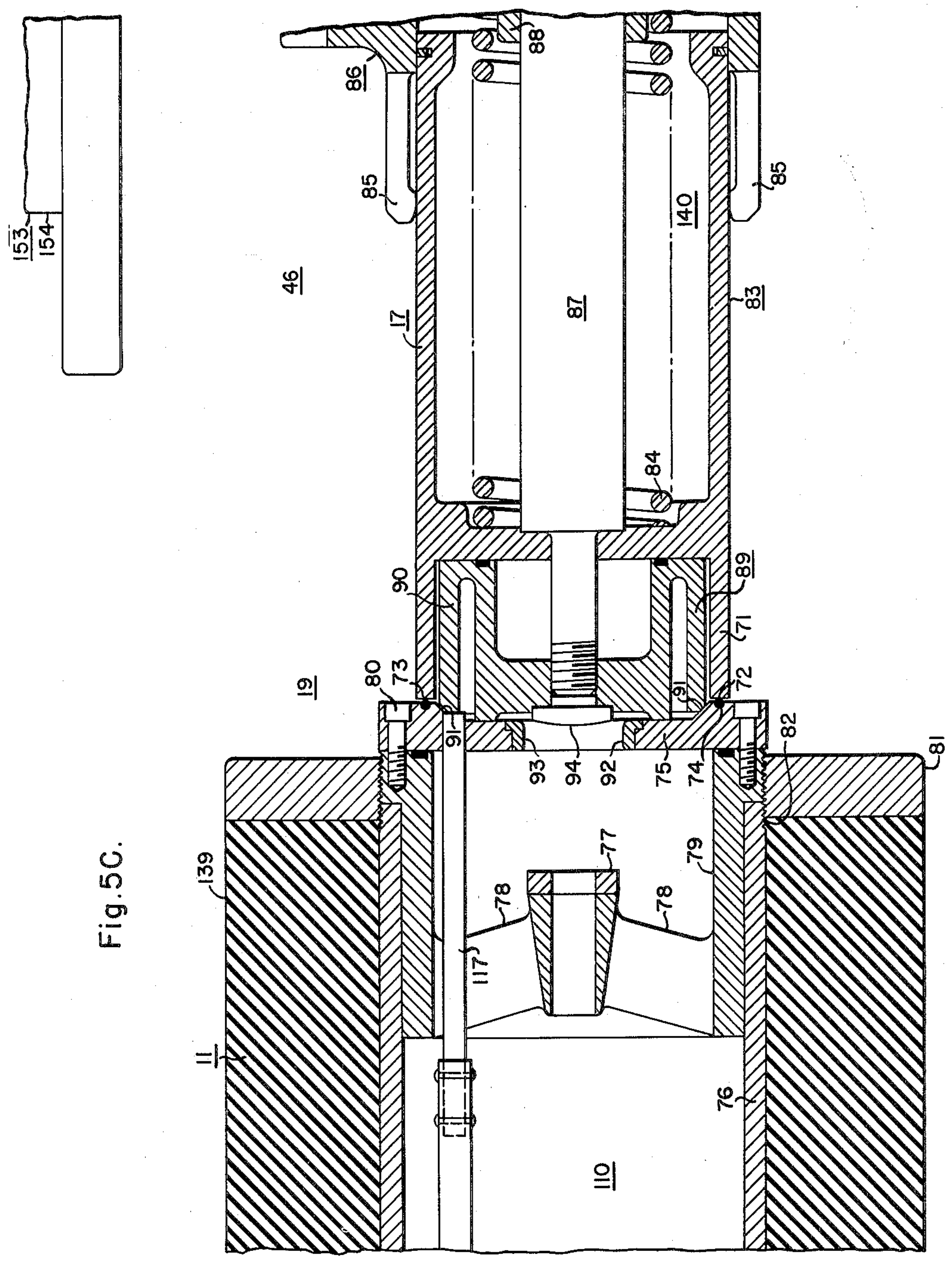
Figure 5D:
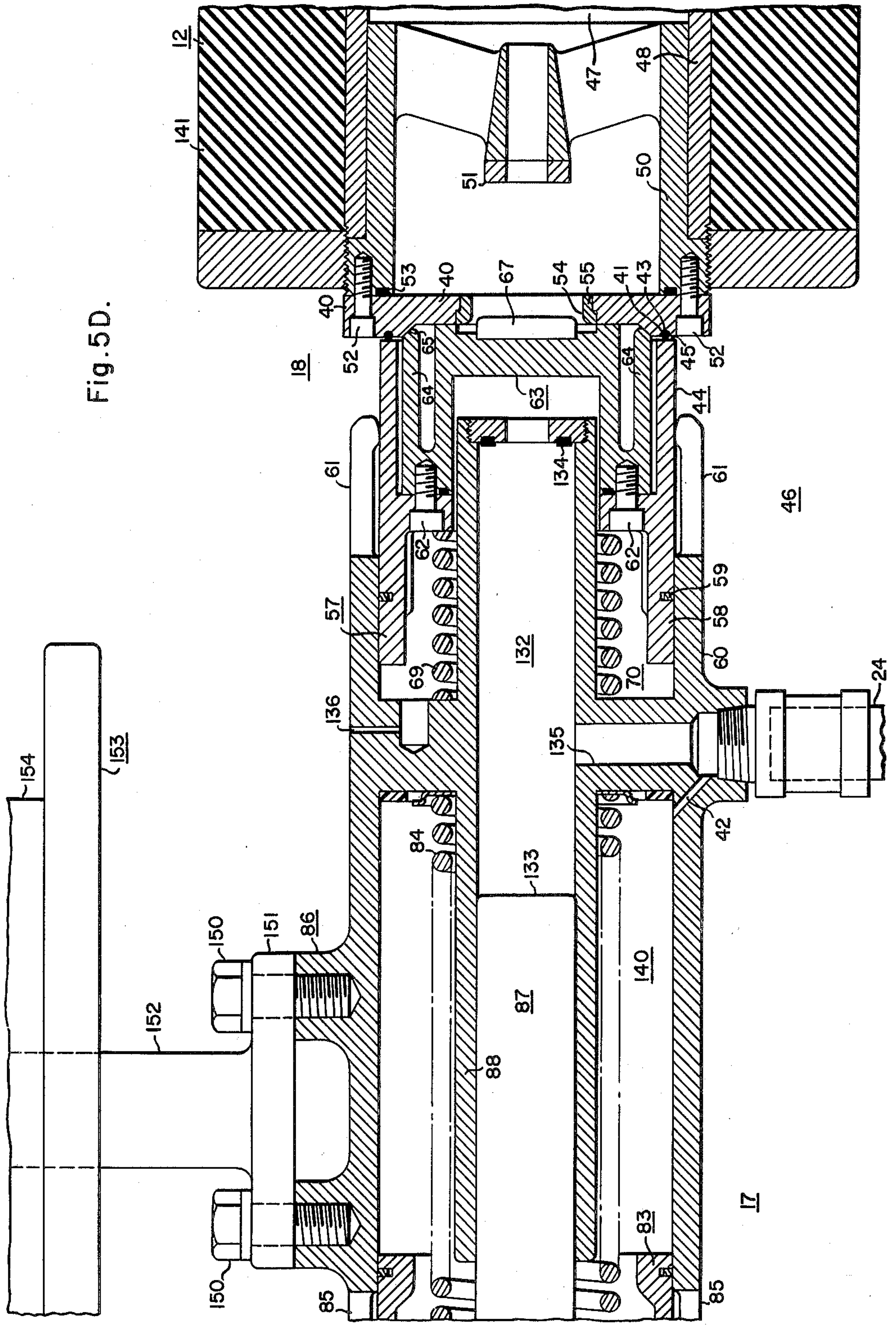

With particular reference to Fig. 5C, which shows more clearly the several parts of the impedance interrupting unit 19, it will be observed that a blast valve 71 is provided, making seating contact with a valve seat 72, the latter being provided by a gasket 73 inserted in a recess 74 of a relatively stationary contact 75. Again a tubular terminal stud 76, extending through the bushing 11, has disposed therein an apertured arc catcher 77 supported by ribs 78 to a tubular support 79. Bolts 80 fixedly secure the relatively stationary contact 75 to the end of the support 79. A retaining ring 81 is threaded about the support 79, and is also threaded to a portion of the hollow terminal stud 76.

The blast valve 71 constitutes a part of a piston assembly 83, biased in a contact-closing direction by a compression spring 84. Fingers 85, formed as an integral part of an intermediate contact support 86, bear against the sides of the piston assembly 83, as shown in Fig. 5C.

A contact guide rod 87, slideably mounted in a guide sleeve 88, forming a part of the intermediate contact support 86, assists in effecting straight-line opening and closing movement of a movable isolating contact 89 of tubular configuration. More specifically, the movable isolating contact 89 comprises a plurality of flexible fingers 90, being laterally flexible, as were the fingers 64 heretofore described, and making flexible contacting engagement with a beveled main contact surface 91 of the relatively stationary contact 75. The stationary contact 75 has an orifice 92 therethrough, which is lined by an arc-resisting sleeve 93. As will be brought out more fully hereinafter, upon rightward opening movement of the blast valve 71 away from its valve seat 72, a blast of air will act upon the arc, established between the separating contacts 90 and the main contact surface 91 to move said arc so that one terminal thereof attaches to the arc catcher 77, whereas the other end terminated at a movable arc-resisting contact 94.

With particular reference to Figs. 2 and 4, it will be observed that the intermediate contact support 86 is bolted, by mounting bolts 150 to a flange portion 151 of a conducting stud 152, which passes upwardly through an impedance terminal bushing 153.

The impedance terminal bushing 153 includes an insulating bushing sleeve 154, surrounding the impedance stud 152, which may contain condenser sections, not shown. As more clearly illustrated in Fig. 2, the insulating terminal sleeve has a reduced section 155, forming a shoulder 156. The shoulder 156 of the insulating sleeve 154 compresses a gasket 157 against a mounting flange 158, which may be welded to the upper side of the grounded tank 10. This insures a gas-tight entrance of the conducting stud 152 into the tank 10.

As shown in Fig. 2, a metallic plate 159 is threaded to the upper end of the stud 152, and has a plurality of circumferentially disposed mounting holes therein to receive elongated insulating bolts 160. The insulating bolts 160 support a plurality of resistor grids 161, diagrammatically shown in Fig. 2, in compressed relation. The resistor grids 161 are in series electrically, and may be of the type set out and claimed in United States Patent 2,632,078, issued March 17, 1953, to Benjamin P. Baker and Erling Frisch, and assigned to the assignee of the instant application. Connections between the resistor grids 161 are diagrammatically indicated in Fig. 2 by flexible straps 162, but in practice the connections between the resistor grids 161 may be as set out in the above Patent 2,632,078.

The grids 161 may be compressed on the insulating bolts 160 by nuts 163 threaded thereon. Also the surrounding porcelain casing 13 may be compressed by springs 164, surrounding the bolts 160 and bearing upon an apertured compression plate 165. The upper ends of the compression springs 164 bear against nuts 166, threaded upon the upper extremities of the insulating bolts 160. A metallic closure cap 167 may be bolted to the compression plate 165 by means not shown, and hence close the upper end of the impedance casing 13. The connecting tube 16 may be bolted, as at 168, to a lug portion 169 of the compression plate 165. A gasket 170 is disposed between the upper end of the porcelain casing 13 and the compression plate 165 so that a dielectric fluid, such as oil 71, may be contained within the casing 13.

The aforesaid construction is advantageous, since no additional support is required for the support 86, and it is necessary to have the impedance element or impedance means 15 in shunt across the main contacts 64 and 65 of the main current interrupting unit 18. In other words, there is a parallel path across the main contacts 64 and 65 by way of resistor grids 161 in the impedance element 15 and through the tubular connector 16 to the outer end 95 (Fig. 2) of the terminal bushing 12.

To prevent the waste of compressed air out through the terminal bushing 11 a conservator 96, more clearly shown in Fig. 5A, is employed. Briefly, the conservator 96 includes a differential valve 97 having a restricted passage 98 therethrough. The differential valve 97 slides within an end closure cap 99 forming an operating cylinder 100, within which one valve portion 101 of the differential valve 97 slides. This valve portion 101 seats upon an annular gasket 102 retained in place by a sealing ring 103, the latter being retained in place to the closure cap 99 by mounting bolts 104. An opening 105 to atmosphere is provided in the closure cap 99. The other valve portion 106 seats against an annular gasket 107 embedded in a recess 108 provided in a flange 109, and prevents the exhaust of compressed air from the region 110 out of the terminal bushing 11 in the fully open-circuit position of the interrupter.

The differential valve 97 has a guide bore 111 therethrough, which is guided upon a guide stud 112 affixed by any suitable means to the closure cap 99. To vent the region 110 within the tubular terminal stud 76 following seating of the valve 106 over its seat 107, a valve means 113 is provided. This valve means 113 includes a poppet-type valve 114, spring-biased by a spring 115 over a seat 116 movable with the valve portion 106. The valve 114 is opened by a valve push rod 117, which is engaged in abutting relation by the movable impedance contact 90 as shown in Fig. 5C. Thus, in the closed-circuit position of the interrupter, as shown in Figs. 5A, 5C and 5D, the valve push rod 117 acting against a spring 118, maintains the valve 114 open, to thereby bring the region 110 down to atmospheric pressure.

As shown in Fig. 5A, a spring support 119 is threaded, as at 120, to the outer end of the terminal stud 76. A plurality of compression springs 121 seat against a spring base 122 having a plurality of threaded holes 123 disposed circumferentially therein. Bolts 124 transmit the spring pressure, exerted by the several springs 121, to a flange ring 125, and thereby maintain a porcelain bushing shell 126 in compression. A spun metal housing 127 is employed to seal in the region 128 interiorly of the casing 126 to thereby enable the terminal bushing 11 to employ an insulating liquid, such as oil, for insulating purposes. Above the liquid level, as at 129, there may be provided an expansion region 130. A blowoff valve 131 mounted in the upper wall of the housnig 127 serves to prevent excessive pressure therein, being set to open at, say, from 45 to 60 p.s.i.g. This takes care of any high-pressure air leakage from the tank 10 along the terminal bushing 11.

From the foregoing description, it will be apparent that following an actuation of the control valve 26 by an energization of the solenoid 27, there will result reduced, or atmospheric pressure within the control conduit 24. This will reduce the pressure within the region 132 (Fig. 5D) in back of the piston assembly 57, thereby causing the same to move to the left, opening the main contacts 64 and 65 and drawing an arc 66 therebetween. Because of the orifice restriction 42 provided in the intermediate contact support 86, the region 140 in back of the piston assembly 83 will not be reduced in pressure until after a slight time delay. Thus, the contacts 64 and 65 will open before the opening of the impedance current interrupting contacts 90 and 91.

The arc 66, established between the contacts 64 and 65, will be transferred by the radial inward flowing gas blast to the contacts 51 and 67, and will be extinguished. This will force the current passing through the pole unit 4 to flow through the impedance element 15, thereby reducing the value of the current and also improving the power factor and reducing the rate at which circuit recovery voltage appears across the contacts 67 and 51. Subsequently, after the high-pressure gas from the region 140 has leaked through the restricted orifice 42, the piston assembly 83 will open, thereby effecting a separation between the impedance current interrupting contacts 90 and 91. The residual-current arc, drawn between the impedance contacts 90 and 91, will be transferred by the radial inward flowing gas blast to the centrally located contacts 77 and 94, being extinguished therebetween. It is to be noted at the beginning of the opening operation, the region 110 within the hollow terminal stud 76 is at low, or atmospheric pressure by virtue of the open valve means 113. Consequently, there is a ready exhaust of compressed air outwardly through the terminal stud 76, snapping the differential piston 97 to its leftward position, not shown, and permitting the exhaust blast to readily pass out of the vent opening 105 in closure cap 99.

The opening movement of the piston assembly 83 of the impedance interrupting unit 19 will carry the guide rod 87 to the right, within the sleeve 88, until the right-hand end 133 of the guide rod 87 will strike the gasket 134 thereby sealing off the communication between the region 70 and the control conduit 24. Also, the opening 135 in the intermediate contact support 86 will be sealed off by the guide rod 87 itself when the latter is in its right-hand position, as shown in Fig. 4. As a result, high-pressure gas will pass from the region 46 through a restricted opening 136 into the region 70 to thereby bring about a reclosure of the main contacts 64 and 65. This will close the blast valve 44, thereby preventing any further blasting of compressed air out through the hollow terminal stud 48. However, before the contacts 64 and 65 reclose, the arc between impedance contacts 77, 94 has already been extinguished and the circuit is maintained open by the separation between the movable impedance contacts 90 and 91.

To insure that the separation of the impedance contacts 90 and 91 will take place in a high-pressure atmosphere and to continually maintain high pressure at these contacts 90 and 91, constituting isolating contacts, it is desirable to effect a cessation of the exhaust blast passing to the left out of the hollow terminal stud 76 of terminal bushing 11. To bring this about, the conservator 96 is provided, and its rapid reclosure occurs as follows: The exhausting of compressed gas out from the region 110 through the opening 105, during the initial portion of the opening operation, causes some high-pressure gas to pass through the restricted opening 98 in the differential valve 97 and into the region 143. This pressure will build up in the region 143, and, since the area of the valve portion 101 is greater than the cross-sectional area of the valve portion 106, the differential valve 97 will be closed with the valve 106 engaging the seat 107, thereby halting any further exhausting of compressed air out through the terminal stud 76. It will be noted that during the opening of the differential valve 97 and during its subsequent reclosure, the poppet valve 114 remains closed over its seat 116, because the movable impedance contact 90 has pulled away from the right-hand end of the valve rod 117, thereby permitting the springs 115 and 118 to close the valve 114.

In the fully open-circuit position of the interrupter, therefore, the movable main contacts 64 and 65 are closed, together with the blast valve 44, and the isolating contacts 90 and 91 are open, as is the blast valve 71, but the isolating gap between the contacts 90 and 91 is at high pressure because of the previous reclosure of the differential valve 97.

To effect reclosure of the circuit through the interrupter, the solenoid 27 of electromagnetic control valve 26 is deenergized. This drops the two-way valve 30, opening the port 32 to permit high-pressure gas from the high-pressure conduit 31 to pass through the control conduit 24 and through the orifice restriction 42 to raise the pressure within the region 140 in back of the piston assembly 83 of the impedance interrupting unit 19. When this occurs, the compression spring 84 will quickly close the impedance contacts 90 and 91, closing the circuit through the interrupter since the main contacts 64 and 65 have previously been reclosed. The striking of the movable impedance current interrupting contact 90 against the valve rod 117 will effect opening of the poppet valve 114 to exhaust the region 110 through the openings 137, associated with valve means 113. This will also bring about a leakage of high-pressure gas from the region 143 in closure cap 99 through the restricted opening 98 and into the region 110, which is now at a reduced pressure. The regions 110 and 143 will hence be lowered to atmosphere pressure, and the interrupter will be in readiness for a subsequent opening operation.

It is a distinct advantage of the present invention that, because of the high-pressure gas, such as air, within the tank 10, reduced gap distances and reduced surface lengths of insulation may be employed. For example, it is proposed that the circuit interrupter of the present invention will, for example, operate at 250 p.s.i.g. air pressure. If, for example, the apparatus is designed for a service voltage of 138 kv., the design test voltage will be 440 kv., peak, of a 60 cycle wave. Referring to the curves in Fig. 7, it will be seen that a four-inch air gap at 250 p.s.i.g. is just sufficient to withstand this test voltage; however, to provide for irregular voltage distribution and for a factor of safety, eight inches has been selected. It is unnecessary to provide for breakdown of this gap at atmospheric pressure because failure of air pressure within the interrupter results in the closing of all gaps before this pressure is obtained.

Again referring to the curves in Fig. 7, if a ¾ inch gap is subjected to the proposed 250 p.s.i.g., operating pressure, its breakdown strength is 235 kv. This is just sufficient to withstand the maximum 225 kv. which may occur across the interrupting gap where the breaker has to interrupt between two electrical systems which are out of phase by 180 electrical degrees. This, of course, is a theoretical maximum, and duty on the breaker further is reduced by voltage regulation on the two systems.

A further consideration determining size is the creepage breakdown voltage over any organic insulation used within the breaker. The required length of creepage is given by data from the curve of Fig. 8. The test voltage for 138 kv. is 310 kv., R.M.S. for one minute. From Fig. 8 at 200 p.s.i.g., the distance required is 18 inches. At 250 p.s.i.g. additional breakdown is provided, so 18 inches is selected as a minimum for the required test voltage. For two systems at 180 electrical degrees out of phase the required voltage is 160 kv. R.M.S. Since 160 kv. is the greatest possible stress during interruption across the low-ohmic resistor 15, its housing may be supported by organic insulation having a creepage of 8 inches. This is less than the 18 inches required for test, and therefore the 18 inches is determining. It is not intended that full test voltage will be applied without normal air pressure, although the 18 inches at atmospheric pressure requires 220 kv., R.M.S., to break it down. This is well above the line-to-ground voltage of 80 kv., R.M.S., that it must withstand in service, when air pressure is not present during only such a time interval that may be required to restore air pressure or operate isolating switches.

From the above, adequate design constants have been determined meeting all voltage requirements. These are as follows: 8 inches isolating gap in 250 p.s.i.g. air pressure; ¾ inch interrupting gap in 250 p.s.i.g. air pressure; and 18 inches creepage over organic insulation at 250 p.s.i.g. air pressure.

Interruption to 10,000,000 kv.a. at 138 kv. is demonstrated by the curves of Fig. 6. These curves are based on experimental data obtained on a 69 kv. interrupter for 5,000,000 kv.a. having an interrupter gap travel of 7⁄16 inch. Since the current to be interrupted at 138 kv. and 10,000,000 kv.a. remains the same as for a 69 kv. circuit at 5,000,000, it follows that circuit inductance at 138 kv. is twice that at 69 kv., and the initial rate of voltage rise across the interrupter gap is the same for both circuits. Thus, for the same ohmic resistor used on the 69 kv. interrupter, 138 kv. and 10,000,000 kv.a. can be interrupted on the same interrupter for the time interval shown in Fig. 6. To extend the interrupter to 138 kv. and complete interruption, it is necessary to provide insulation according to the limiting dimensions previously determined. As shown in Fig. 6, the interrupting margin can be increased by reducing the value of the resistor. This reduction is limited by the interrupting ability of the isolator gap, although the interruption to 20,000 amperes by the isolator gap appears to be feasible.

It will be noted that the current transformers 138, surrounding the terminal bushings 11, 12 may be mounted interiorly of the tank 10 about the insulations 139 and 141 of the respective bushings 11 and 12. The left-hand end of terminal bushing 12, as viewed in Fig. 2, is also always open to the atmosphere, as is region 47 within the terminal stud 48 of this bushing. The pressure within the region 110 within the terminal stud 76 of terminal bushing 11 depends upon the position of the blast valve 71 and that of differential valve 97. At the beginning of the opening operation, the region 110 is at atmospheric pressure, as is region 143 to the left of the differential valve 97. The poppet valve 114 is open at this time. The opening of the isolating contacts 90 and 91 closes the poppet valve 114 and opens blast valve 71, resulting in a blast of gas through the terminal stud 76 and out of the opening 105. Poppet valve 114 closes upon the separation of the impedance contacts 90 and 91, so that the resulting gas blast will effect reclosing of the differential valve 97 by differential piston action. Thus, the isolating contacts 90 and 91 will be maintained separated in a high-pressure atmosphere. Thus, a reduced amount of air pressure is utilized, and a reduced isolating gap results.

The terminal bushings 11 and 12, which are employed in the practice of the invention, may be of relatively standard construction, it merely being necessary to have hollow terminal studs therefor, with the outer end of terminal bushing 11 modified to incorporate the conservator 96. However, the condenser insulation for both bushings may be practically standard, and the filling fluid may be that customarily used in filling terminal bushings. Preferably, the porcelain casings 126 are maintained in compression by tension imposed upon the interiorly disposed hollow terminal studs 48 and 76.

To insure that there will be no leakage of high pressure air lengthwise along the insulation 139, a gasket 145 (Fig. 5B) may be used, being interposed between a shoulder 146 machined on the insulation 139, and the intermediate flange 147 of the bushing 11. The intermediate flange 147 may be bolted to the right-hand end of the tank 10, as viewed in Fig. 2, by any suitable means. Leakage along the terminal bushing 12 may be prevented in a similar manner.

From the foregoing description, it will be apparent that there is provided an improved compressed-gas circuit interrupter of reduced dimensions, and very effectively employing high-pressure gas, not only as an interrupting means, but also as a means of using a small length of isolating gap because of the high-dielectric strength of the high-pressure gas. It will be observed that the operating mechanism provides proper sequential opening of the interrupting contacts and the impedance contacts, with a portion 87 of the movable impedance current interrupting contact serving as a valve to close off the low-pressure connection in back of the piston assembly 57 of the main interrupting unit 18. Thus, the mechanism is simple, involving few parts, and insuring that a blast of gas is readily available immediately upon separation of the contact structure.

Since grounded metallic tanks 10 are employed with clamped terminal bushings at opposite ends thereof, the entire construction is very sturdy and rigid, being uneffected by earthquake shocks and other disturbances.

Although there has been shown and described a specific structure, it is to be clearly understood that the same was merely for the purpose of illustration, and that changes and modifications may readily be made therein by those skilled in the art without departing from the spirit and scope of the invention.

I claim as my invention:

1. A compressed-gas circuit interrupter including a tank containing gas under high pressure, a pair of hollow terminal bushings extending into said tank having relatively stationary contacts supported adjacent their inner ends, a bridging interrupting assembly disposed interiorly within said high-pressure tank for electrically bridging the two relatively stationary contacts in the closed-circuit position of the circuit interrupter, the bridging interrupting assembly having a pair of movable contacts which make separable engagement with said two relatively stationary contacts, impedance means electrically shunting said bridging interrupting assembly and one of said relatively stationary contacts, means separating one of said movable contacts from said one relatively stationary contact and for extinguishing the arc drawn therebetween by a blast of high-pressure gas from the tank out through the hollow terminal bushing associated with said one relatively stationary contact, means for subsequently separating the other movable contact from the other relatively stationary contact to draw a residual current arc therebetween, and means providing a blast of high-pressure gas out through the other hollow terminal bushing to effect the extinction of the residual current arc.

2. A compressed-gas circuit interrupter including a tank containing gas under high pressure, a pair of hollow terminal bushings extending into said tank having relatively stationary contacts supported adjacent their inner ends, a bridging interrupting assembly disposed interiorly within said high-pressure tank for electrically bridging the two relatively stationary contacts in the closed-circuit position of the circuit interrupter, the bridging interrupting assembly having a pair of movable contacts which make separable engagement with said two relatively stationary contacts, impedance means including an impedance terminal bushing extending interiorly within said high-pressure tank, said impedance terminal bushing suspending said bridging interrupting assembly within the high-pressure tank and constituting the sole support therefor so that a free gap exists between each movable contact and its cooperable stationary contact in the open circuit position of the contacts, said impedance means electrically shunting said bridging interrupting assembly and one of said relatively stationary contacts, means separating one of said movable contacts from said one relatively stationary contact and for extinguishing the arc drawn therebetween by a blast of high-pressure gas from the tank out through the hollow terminal bushing associated with said one relatively stationary contact, means for subsequently separating the other movable contact from the other relatively stationary contact to draw a residual current arc therebetween, and means providing a blast of high-pressure gas out through the other hollow terminal bushing to effect the extinction of the residual current arc.

3. The combination in a compressed-gas circuit interrupter of a tank containing gas under high pressure, a pair of hollow terminal bushings extending into said tank and supporting relatively stationary contacts adjacent their inner ends, a bridging interrupting assembly disposed interiorly within said high-pressure tank for electrically bridging the two relatively stationary contacts in the closed-circuit position of the circuit interrupter, the bridging interrupting assembly having a pair of movable contacts which make separable engagement with said two relatively stationary contacts, impedance means electrically shunting said bridging interrupting assembly and one of said relatively stationary contacts, means separating one of said movable contacts from said one relatively stationary contact and for extinguishing the arc drawn therebetween by a blast of high-pressure gas from the tank out through the hollow terminal bushing associated with said one relatively stationary contact, means for subsequently separating the other movable contact from the other relatively stationary contact to draw a residual current arc therebetween, means providing a blast of high-pressure gas out through the other hollow terminal bushing to effect the extinction of the residual current arc, and means closing one of said movable contacts in the fully open circuit position of the interrupter while maintaining the other movable contact in an isolating open position in the fully open circuit position of the interrupter.

4. A compressed-gas circuit interrupter including a tank containing gas under high pressure, a pair of hollow terminal bushings extending into said tank having relatively stationary contact structures supported adjacent their inner ends, an electrically bridging interrupting assembly, an impedance element extending into said high-pressure tank supporting said interrupting assembly in suspended fashion and constituting the sole support therefor, said interrupting assembly having a pair of movable contacts, one of said movable contacts cooperable with one of said relatively stationary contact structures, the other movable contact being cooperable with the other relatively stationary contact structure, means connecting said impedance element between one of said relatively stationary contact structures and said bridging interrupting assembly, and means opening the movable contact associated with said one relatively stationary contact structure prior to the opening of the other movable contact.

5. A compressed-gas circuit interrupter including a tank containing gas under high pressure, a pair of hollow terminal bushings extending into said tank having relatively stationary contacts at their inner ends, an interrupting assembly disposed within said tank and having a pair of movable contacts, one of said pair of movable contacts being cooperable with one of said relatively stationary contacts to establish arcing adjacent the inner end of one of said pair of hollow terminal bushings, the other of said pair of movable contacts being cooperable with the other relatively stationary contact to establish an isolating gap adjacent the inner end of the other hollow terminal bushing, means for sending a blast of gas out through the two hollow terminal bushings, means defining a conservator adjacent the outer end of one hollow terminal bushing, and actuating means for operating said conservator extending through said other hollow terminal bushing and responsive to the position of said other movable contact.

6. The combination in a compressed-gas circuit interrupter of a tank containing gas at high pressure, a pair of hollow terminal bushings extending into said high-pressure tank, a pair of relatively stationary contacts associated with the interior ends of said two hollow terminal bushings, an interrupting assembly disposed within said tank and having a pair of movable contacts cooperable with said pair of relatively stationary contacts, a blast valve associated with each movable contact. means closing one blast valve in the open-circuit position associated with the interior end of one terminal bushing, means maintaining the other blast valve open in the open-circuit position, and a conservator at the outer end of the other hollow terminal bushing.

7. A compressed-gas circuit interrupter including tank means defining a high-pressure chamber, a pair of hollow terminal bushings extending into said tank means and supporting a pair of spaced relatively stationary contacts adjacent the inner ends thereof, a bridging interrupting assembly disposed within said chamber and including a pair of movable contacts cooperable with said pair of spaced relatively stationary contacts, a piston associated with each movable contact to effect the opening thereof, means exhausting the space in back of one piston to effect the opening of one movable contact associated therewith, impedance means connected between said bridging interrupting assembly and the relatively stationary contact associated with said one movable contact, means restricting the exhausting of the space in back of the other piston associated with the other movable contact to bring about a delayed opening of the other movable contact, the arrangement providing a sequential opening of the two movable contacts, and high-pressure gas exhausting out both hollow terminal bushings to extinguish arcing at the relatively stationary contacts.

8. A compressed-gas circuit interrupter including a high-pressure chamber, a pair of spaced relatively stationary contacts disposed within said high-pressure chamber, a bridging interrupting assembly having a pair of piston-actuated movable contacts cooperable with said pair of relatively stationary contacts, an exhaust passage for exhausting the region in back of one piston-actuated movable contact to establish an arc between the last-mentioned movable contact and its cooperable relatively stationary contact, means exhausting the region in back of the other piston-actuated movable contact to effect its opening motion, and valve means movable with said other piston-actuated movable contact to close said exhaust passage to halt the exhausting back of said one piston-actuated movable contact.

9. A compressed-gas circuit interrupter including a high-pressure chamber, a pair of spaced relatively stationary contacts disposed within said high-pressure chamber, a bridging interrupting assembly having a pair of piston-actuated movable contacts cooperable with said pair of relatively stationary contacts, an exhaust passage for exhausting the region in back of one piston-actuated movable contact to establish an arc between the last-mentioned movable contact and its cooperable relatively stationary contact, means exhausting the region in back of the other piston-actuated movable contact to effect its opening motion, valve means movable with said other piston-actuated movable contact to close said exhaust passage to halt the exhausting back of said one piston-actuated movable contact, and a high-pressure inlet for feeding high-pressure gas in the region back of said one piston-actuated movable contact.

10. A compressed-gas circuit interrupter including a high-pressure chamber, a pair of spaced relatively stationary contacts disposed within said high-pressure chamber, a bridging interrupting assembly having a pair of piston-actuated movable contacts cooperable with said pair of relatively stationary contacts, an exhaust passage for exhausting the region in back of one piston-actuated movable contact to establish an arc between the last-mentioned movable contact and its cooperable relatively stationary contact, means restricting the exhausting of the region in back of the other piston-actuated movable contact to effect its subsequent opening motion, and valve means movable with said other piston-actuated movable contact to close said exhaust passage to halt the exhausting back of said one piston-actuated movable contact.

11. A compressed-gas circuit interrupter including a high-pressure chamber, a pair of spaced relatively stationary contacts disposed within said high-pressure chamber, a bridging interrupting assembly having a pair of piston-actuated movable contacts cooperable with said pair of relatively stationary contacts, an exhaust passage for exhausting the region in back of one piston-actuated movable contact to establish an arc between the last-mentioned movable contact and its cooperable relatively stationary contact, means restricting the exhausting of the region in back of the other piston-actuated movable contact to effect its subsequent opening motion, valve means movable with said other piston-actuated movable contact to close said exhaust passage to halt the exhausting back of said one piston-actuated movable contact, and a high pressure inlet for feeding high-pressure gas in the region back of said one piston-actuated movable contact.

12. The combination in a compressed-gas circuit interrupter of means defining a high-pressure chamber, a pair of hollow terminal bushings extending interiorly within said high-pressure chamber and supporting a pair of relatively stationary, spaced contacts within said chamber, a relatively stationary interrupting assembly disposed within said high-pressure chamber between said relatively stationary contacts, impedance means shunting said interrupting assembly and one of said relatively stationary contacts, said interrupting assembly including a pair of piston-actuated movable contacts cooperable with said pair of relatively stationary contacts, and means for successively exhausting the regions in back of said piston-actuated movable contacts to draw an arc at said one relatively stationary contact prior to the drawing of an arc at the other relatively stationary contact.

13. The combination in a compressed-gas circuit interrupter of means defining a high-pressure chamber, a pair of hollow terminal bushings extending interiorly within said high-pressure chamber and supporting a pair of relatively stationary, spaced contacts within said chamber, a relatively stationary interrupting assembly disposed within said high-pressure chamber between said relatively stationary contacts, impedance means shunting said interrupting assembly and one of said relatively stationary contacts, said interrupting assembly including a pair of piston-actuated movable contacts cooperable with said pair of relatively stationary contacts, means biasing said piston-actuated movable contacts to the closed position, means exhausting the region in back of one piston-actuated movable contact associated with said one relatively stationary contact, and means restricting the exhausting of the region in back of the other piston-actuated movable contact so that the movable contacts will be successively opened.

14. A compressed-gas circuit interrupter including a grounded, metallic high-pressure tank containing gas at high pressure, a pair of hollow terminal bushings extending into said tank and carrying a pair of relatively stationary contacts in spaced relation at their inner ends, an interrupting assembly disposed within said high-pressure tank between said pair of relatively stationary contacts and including a pair of movable contacts cooperable with said pair of relatively stationary contacts, impedance means connected between said interrupting assembly and one of said relatively stationary contacts, a conservator at the outer end of the hollow terminal bushing carrying the other relatively stationary contact, means for opening the movable contact cooperable with said other relatively stationary contact and maintaining the same in its open position during the open-circuit position of the interrupter, and means for opening and subsequently reclosing the other movable contact during the opening operation of the interrupter.

15. A compressed-gas circuit interrupter including a grounded, metallic high-pressure tank containing gas at high pressure, a pair of hollow terminal bushings extending into said tank and carrying a pair of relatively stationary contacts in spaced relation at their inner ends, an interrupting assembly disposed within said high-pressure tank between said pair of relatively stationary contacts and including a pair of movable contacts cooperable with said pair of relatively stationary contacts, impedance means connected between said interrupting assembly and one of said relatively stationary contacts, a conservator at the outer end of the hollow terminal bushing carrying the other relatively stationary contact, piston means associated with each of said movable contacts, means biasing said movable contacts to the closed position, and means for successively exhausting the regions in back of the two piston means for effecting the successive opening of said movable contacts.

16. A compressed-gas circuit interrupter including a grounded, metallic high-pressure tank containing gas at high pressure, a pair of hollow terminal bushings extending into said tank and carrying a pair of relatively stationary contacts in spaced relation at their inner ends, an interrupting assembly disposed within said high pressure tank between said pair of relatively stationary contacts and including a pair of movable contacts cooperable with said pair of relatively stationary contacts, impedance means connected between said interrupting assembly and one of said relatively stationary contacts, a conservator at the outer end of the hollow terminal bushing carrying the other relatively stationary contact, piston means associated with each of said movable contacts, means biasing said movable contacts to the closed position, means for successively exhausting the regions in back of the two piston means for effecting the successive opening of said movable contacts, means maintaining the movable contact cooperable with said other relatively stationary contact open in an isolated position in the fully open-circuit position of the interrupter, and means effecting the reclosing of the other movable contact in said open-circuit position of the interrupter.

17. A compressed-gas circuit interrupter including a high-pressure chamber, a hollow terminal bushing extending into said high-pressure chamber and carrying a relatively stationary contact at its inner end, a movable contact cooperable with said relatively stationary contact, a conservator disposed at the outer end of said hollow terminal bushing, and operating means for said conservator including a rod movable longitudinally of the hollow terminal bushing and abutting said movable contact in the closed position of the latter.

18. A compressed-gas circuit interrupter including a high-pressure chamber, a hollow terminal bushing extending into said high-pressure chamber and carrying a relatively stationary contact at its inner end, a movable contact cooperable with said relatively stationary contact, a conservator disposed at the outer end of said hollow terminal bushing, an operating cylinder, a piston for actuating said conservator and movable within said operating cylinder, a passage through said piston, and operating means for said conservator including a rod movable longitudinally of the hollow terminal bushing and abutting said movable contact in the closed position of the latter.

19. The combination in a compressed-gas circuit interrupter of a tank containing gas under high pressure, a pair of hollow terminal bushings extending into said tank and supporting relatively stationary contacts adjacent their inner ends, a bridging interrupting assembly disposed interiorly within said high-pressure tank for electrically bridging the two relatively stationary contacts in the closed-circuit position of the circuit interrupter, the bridging interrupting assembly having a pair of movable contacts which make separable engagement with said two relatively stationary contacts, impedance means electrically shunting said bridging interrupting assembly and one of said relatively stationary contacts, means separating one of said movable contacts from said one relatively stationary contact and for extinguishing the arc drawn therebetween by a blast of high-pressure gas from the tank out through the hollow terminal bushing associated with said one relatively stationary contact, means for subsequently separating the other movable contact from the other relatively stationary contact to draw a residual current arc therebetween, means providing a blast of high-pressure gas out through the other hollow terminal bushing to effect the extinction of the residual current arc, means closing one of said movable contacts in the fully open circuit position of the interrupter while maintaining the other movable contact in an isolating open position in the fully open circuit position of the interrupter, and valve means closing the outer end of the hollow terminal bushing associated with said other movable contact to conserve gas pressure.

References Cited in the file of this patent

UNITED STATES PATENTS

| | | |
|---|---|---|
| 1,706,746 | Rice | Nov. 26, 1929 |
| 1,898,901 | Ruppel | Feb. 21, 1933 |
| 2,222,722 | Rankin | Nov. 26, 1940 |
| 2,459,600 | Strom | Jan. 18, 1949 |
| 2,507,210 | Ludwig et al. | May 9, 1950 |
| 2,531,617 | Forwald | Nov. 28, 1950 |
| 2,554,974 | Beatty | May 29, 1951 |
| 2,561,192 | Forwald | July 17, 1951 |
| 2,586,290 | Baker et al. | Feb. 19, 1952 |
| 2,599,100 | Forwald | June 3, 1952 |
| 2,627,005 | Baker et al. | Jan. 27, 1953 |
| 2,729,721 | Forwald | Jan. 3, 1956 |

FOREIGN PATENTS

| | | |
|---|---|---|
| 575,108 | Great Britain | Feb. 4, 1946 |
| 582,599 | Great Britain | Nov. 21, 1946 |
| 712,000 | Great Britain | July 14, 1954 |